(12) United States Patent
Chen et al.

(10) Patent No.: US 8,861,140 B1
(45) Date of Patent: Oct. 14, 2014

(54) SLIDER SUPPORTING APPARATUS

(71) Applicant: SAE Magnetics (H.K.) Ltd., Hong Kong (CN)

(72) Inventors: Yu Xin Chen, DongGuan (CN); Fang Long Nie, DongGuan (CN); Ho Hang Keith Wong, Hong Kong (CN); Liang Xing, DongGuan (CN); Chao Luo, DongGuan (CN); Ri Xin Cai, DongGuan (CN); Yan Ju Feng, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 14/019,635

(22) Filed: Sep. 6, 2013

(30) Foreign Application Priority Data

Aug. 1, 2013 (CN) .......................... 2013 1 0332366

(51) Int. Cl.
*G11B 5/60* (2006.01)
*G11B 15/64* (2006.01)
*G11B 17/32* (2006.01)
*G11B 21/20* (2006.01)
*G11B 5/48* (2006.01)

(52) U.S. Cl.
CPC .................................. *G11B 5/4826* (2013.01)
USPC ........................................................ 360/234.6

(58) Field of Classification Search
USPC ............................................ 360/234.5, 234.6
See application file for complete search history.

(56) References Cited

U.S. PATENT DOCUMENTS

2007/0002494 A1 * 1/2007 Takahashi et al. ......... 360/234.6

* cited by examiner

*Primary Examiner* — Joseph Feild
*Assistant Examiner* — Gustavo Polo
(74) *Attorney, Agent, or Firm* — Nixon & Vanderhye PC (57) ABSTRACT

A slider supporting apparatus of includes a base portion; a flexure supported by the base portion; a contact portion being provided on a leading portion of the flexure for urging a trailing edge of the slider to contact with pads on the trailing edge; a support plate attached beneath a tongue; and a clamp comprising a mounting portion fixed on the support plate, two spring arms downward extended from the mounting portion to pass through a hole of the flexure slantwise, and a connection bar connected with two ends of the spring arms for urging a leading edge of the slider to provide a downward component force to the slider. The apparatus provides a larger spring stroke with long lifetime to reduce cost, and avoid pitch and roll static torque to generate so as to prevent the slider popping out the suspension during slider testing process.

10 Claims, 11 Drawing Sheets

SLIDER SUPPORTING APPARATUS

FIELD OF THE INVENTION

The present invention relates to a slider supporting apparatus for supporting a slider of a hard disk drive during a testing process of the slider before it is incorporated into a head gimbal assembly (HGA).

BACKGROUND OF THE INVENTION

Figure 1A:
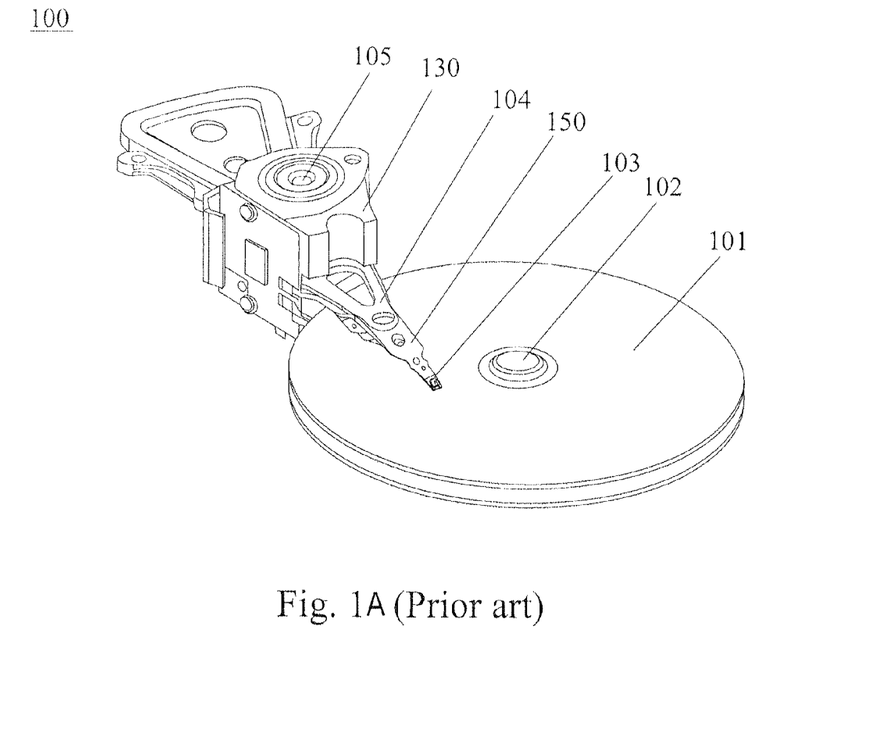
FIG. 1A is a perspective view of a conventional disk drive unit.

Hard disk drives are common information storage devices. FIG. 1A provides an illustration of a typical disk drive unit 100 essentially consisting of a series of rotatable disks 101 mounted on a spindle motor 102, and a Head Stack Assembly (HSA) 130 which is rotatable about an actuator arm axis 105 for accessing data tracks on disks during seeking. The HSA 130 includes at least one drive arm 104 and HGA 150. Typically, a spindling voice-coil motor (VCM) is provided for controlling the motion of the drive arm 104.

Figure 1B:
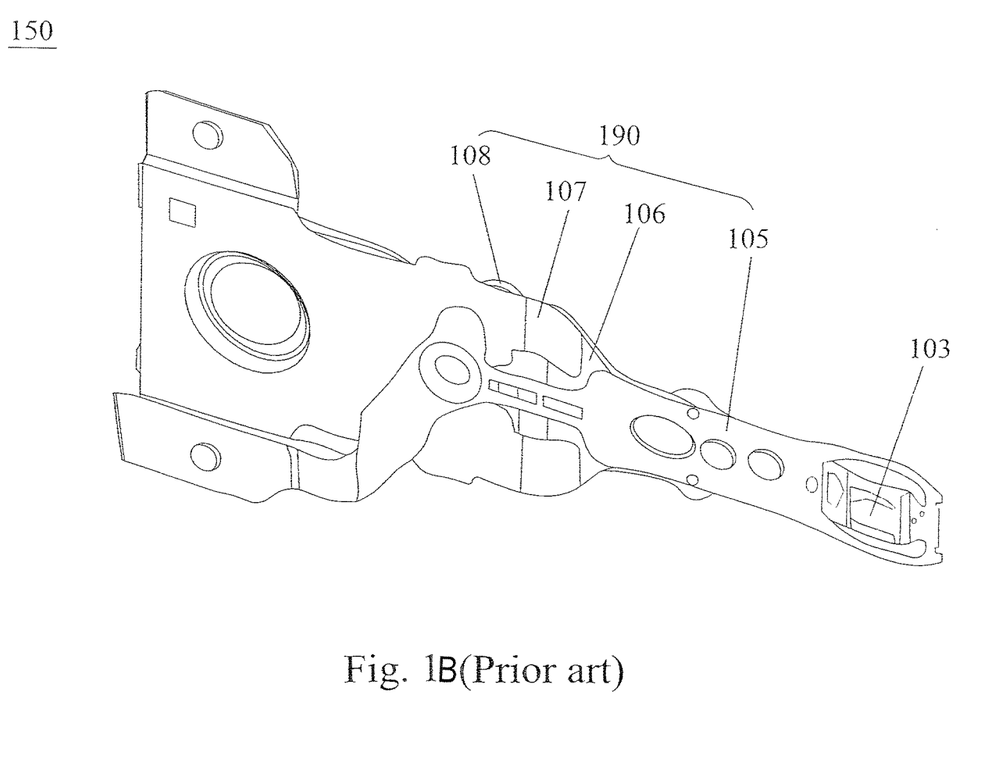
FIG. 1B is a perspective view of a conventional HGA.

Referring to FIG. 1B, the HGA 150 includes a slider 103 having a reading/writing transducer (not shown) imbedded therein, a HGA suspension 190 to load or suspend the slider 103 thereon. When the disk drive is on, a spindle motor 102 will rotate the disk 101 at a high speed, and the slider 103 will fly above the disk 101 due to the air pressure drawn by the rotated disk 101. The slider 103 moves across the surface of the disk 101 in the radius direction under the control of the VCM. With a different track, the slider 103 can read data from or write data to the disk 101.

Figure 1C:
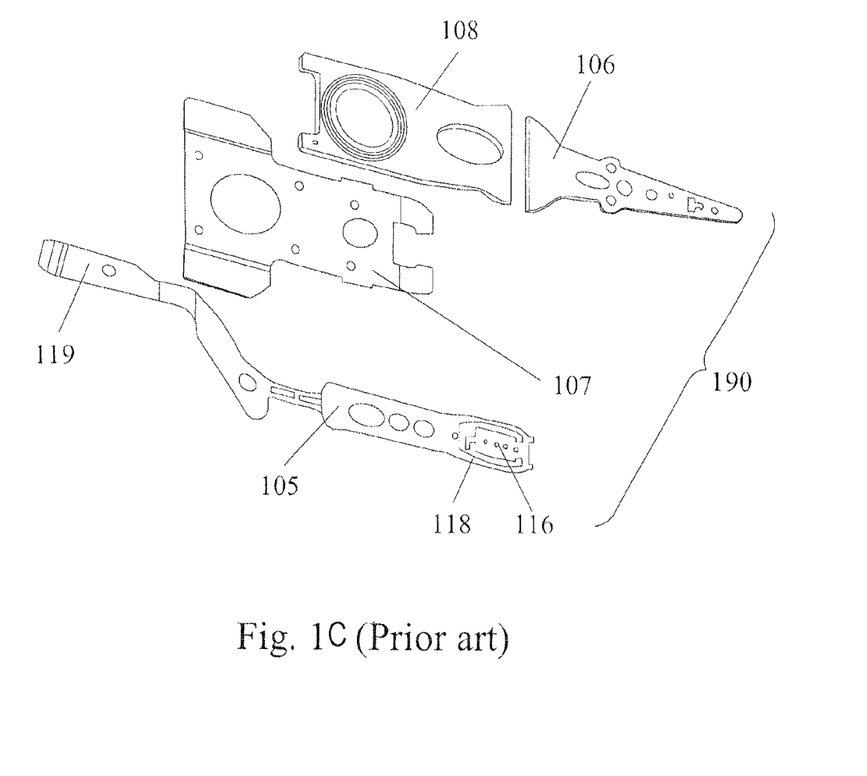
FIG. 1C is an exploded perspective view of the HGA shown in FIG. 1B.

FIG. 1C shows a conventional HGA suspension, the HGA suspension 190 includes a load beam 106, a base plate 108, a hinge 107 and a flexure 105, all of which are assembled together.

The load beam 106 is connected to the base plate 108 by the hinge 107. The base plate 108 is used to enhance structure stiffness of the whole HGA 150. The flexure 105 runs from the hinge 107 to the load beam 106. The flexure 105 has a distal end 119 adjacent the hinge 107 and a proximal end 118 adjacent the load beam 106. A suspension tongue 116 is provided at the distal end of the flexure 105 to carry the slider 103 thereon.

Conventionally, a plurality of electrical traces (not shown) is formed on the flexure 105 along length direction thereof. More specifically, the electrical traces begin with the proximal end 118 and terminate at the distal end 119. The HGA suspension tongue 116 has a plurality of probes (not shown) formed thereon for coupling the slider 103.

Conventionally, sliders are fixedly mechanically mounted to the HGA suspension by adhesive and electrically connected to the probes on the HGA suspension tongue by solder balls. Testing such as dynamic performance testing is typically performed on the suspension before the HGA including the slider and the HGA suspension incorporated into a disk drive. Those sliders in the HGA which are concluded to be non-defective as a result of the testing are incorporated into HSA into an actual disk drive. Those sliders in the HGA which are judged to be defective are rejected with the HGA suspension. If a slider is rejected as defective, therefore, its HGA suspension will be rejected, resulting in an increase in cost. Possibly, defective slider may be removed from their HGA suspensions so that the HGA suspension can be reused. However, this operation is troublesome and may damage the HGA suspensions, as the slider is connected with the HGA suspension by glue and solder ball.

To solve these issues, a slider supporting apparatus for testing sliders has been developed. The slider supporting apparatus has a load beam, flexure, etc., constructed in the same manner as those of HGA suspension and can be movably fitted with a slider, so that the slider can be tested on the apparatus. After that, a good slider will be mounted on an HGA suspension without testing.

Figure 2:
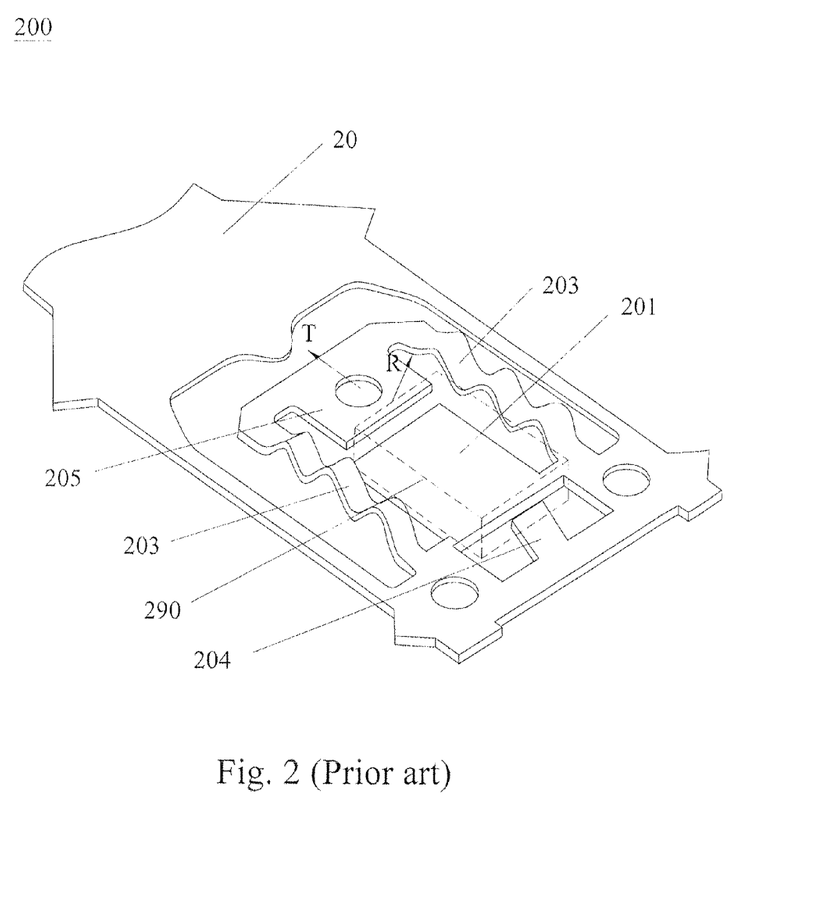
FIG. 2 is a partial perspective view of a conventional slider supporting apparatus having bellows portions.

As shown in FIG. 2, a conventional slider supporting apparatus 200 includes a tongue 201, a pair of bellows portion 203 as springs, a first support portion 204, a second portion 205, etc., which constitute a part of a flexure 20. Each bellows portion 203 has a top and bottom that are formed by plastic deformation. This formation may be achieved by corrugating a part of the flexure 20 in its thickness direction like waves. The slider 290 is placed on the tongue 201 with the bellows portions 203 stretched in the direction of arrow T by means of a jig not shown. Thereafter, the bellows portions 203 are released from the applied tension, whereupon the slider 290 is clamped between the support portions 204 and 205. When the disk in the slider tester is rotated at high speed with respect to the slider 290, the slider 290 flies above the disk. Various checks are performed in this state. After the checks are finished, the slider 290 is removed from between the support portions 204 and 205 by stretching the bellows portions 203 with the jig. The sliders which are judged to be unacceptable by the checks are abandoned.

To increase the stroke of the bellows structure, the number of bellows may be increased. However, the length of the spring structure cannot be increased and is limited by the size of the slider structure. Thus, the stroke for extension and contraction is short. Moreover, the bellows portions 203 apply an undesirable out of plane moment tending to pop the slider 290 out of the tongue due to manufacturing tolerances during the plastic forming of the bellows. The moment can also contribute to generating pitch and roll static torque R, contributing to load and unload magnetic media damage and slider media contact during the slider testing.

Figure 3:
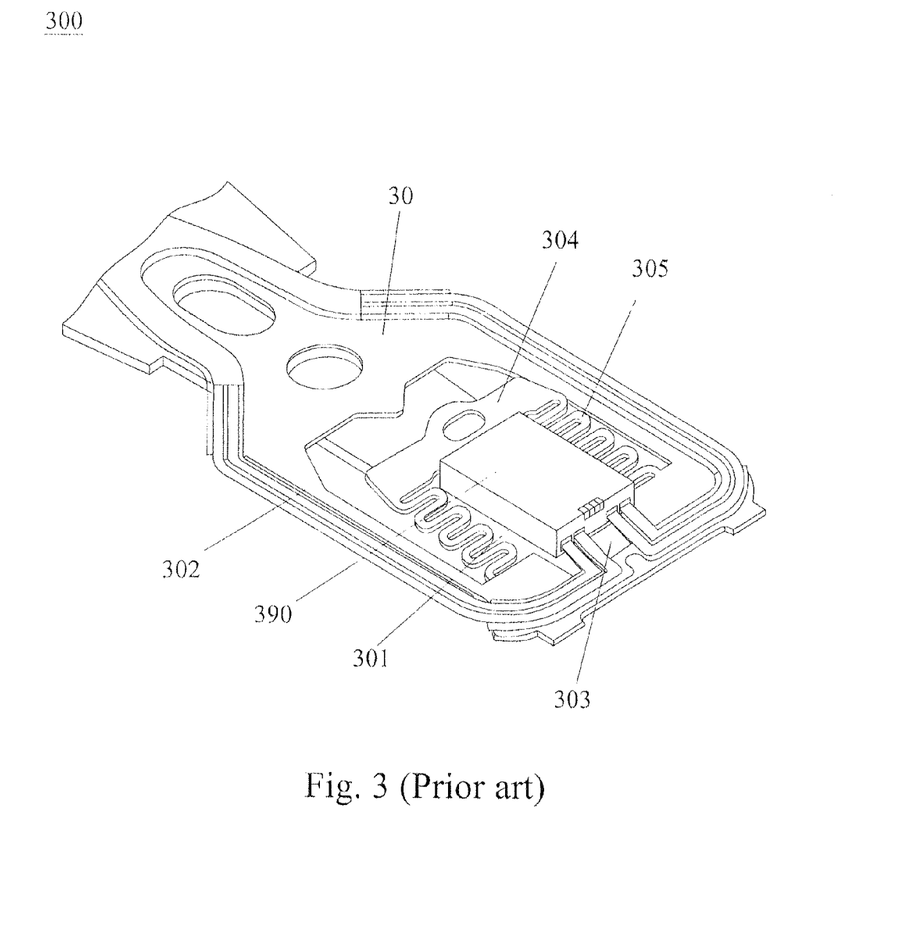
FIG. 3 is a partial perspective view of another conventional slider supporting apparatus having flat springs.

Accordingly, an improved slider supporting apparatus has been developed. As shown in FIG. 3, the slider supporting apparatus 300 includes a flexure 30 formed of a metal plate having spring characteristics. The flexure 30 has a tongue 301 to be mounted with the slider 390, a pair of outrigger portion 302, first support portions 303, a second support portion 304, and a spring portion formed of a pair of flat springs 305, left and right, etc. Each flat spring 305 has a plurality of U-shaped convexes and inverted U-shaped concaves. The convexes and the concaves are alternately formed in the front-back direction of the flexure 30 along the surface direction of the flexure 30 as a zigzag shape. Although the zigzag design could reduce pitch and roll static torque, the alternating concaves and convexes provide a low out of plane stiffness and a large exposed real estate area susceptible to windage excitation during the loading onto a rotating magnetic medium during slider testing. Windage excitations cause out of plane vibration imparted to the slider 390 during write read operation leading to off track motions. Thus the number of zigzags is needed to reduce to reduce the windage excitation, which in turns limits the spring stroke of the flat springs 305, however.

Thus, there is a need for an improved slider supporting apparatus that can provide a larger stroke with long lifetime, meanwhile avoid pitch and roll static torque to prevent the slider popping out.

SUMMARY OF THE INVENTION

One aspect of the present invention is to provide a slider supporting apparatus, which can provide a larger spring stroke with long lifetime to reduce cost, and avoid pitch and roll static torque to generate so as to prevent the slider popping out during slider testing process.

To achieve above objective, a slider supporting apparatus of the present invention includes a base portion; a flexure supported by the base portion, the flexure comprising a tongue carried a slider and a leading portion connected with the tongue; a contact portion is provided on the leading portion arranged for urging a trailing edge of the slider to contact with pads on the trailing edge; a support plate attached beneath the tongue; and a clamp comprising a mounting portion fixed on the support plate, two spring arms downward extended from the mounting portion to pass through a hole of the flexure slantwise, and a connection bar connected with two ends of the spring arms for urging a leading edge of the slider to provide a downward component force to the slider.

Preferably, a predetermined spacing is provided between the two spring arms to allow the tongue to insert, and the connection bar is positioned above and across the tongue.

As a preferred embodiment, each spring arm comprises a first section, a second section and a third section, a first angle between the first section and the mounting portion is in a range of 80°~110°, a second angle between the first section and the second section is in a range of 100°~125°, a third angle between the second section and the third section is in a range of 80°~100°, and a fourth angle between the third section and the connection bar is in a range of 110°~140°.

As a preferred embodiment, the mounting portion is parallel to the support plate, and each spring arm is bent downward along the mounting portion to form a U-shaped spring arm.

As an optional embodiment, the mounting portion is parallel to the support plate, each spring arm is bent downward along the mounting portion to form a V-shaped spring arm.

As an embodiment, the contact portion comprises a plurality of probes contacted with pads on the trailing edge of the slider, a rigid support layer (made of SST, such as) supported above the probes, and an insulating layer sandwiched between the probes and the rigid support layer.

Preferably, the rigid support layer is a part of an outrigger of the flexure.

Preferably, the base portion comprises a base plate, a load beam, and a hinge arranged for connecting with the base plate and the load beam.

More preferably, the base plate comprises a handling area to allow a nozzle device to operate thereon.

Preferably, two limiting holes are provided on the load beam, two limiters are provided on two ends of the support plate to pass through the limiting holes.

In comparison with the prior art, the present invention provides a clamp including a mounting portion fixed on the support plate, two spring arms downward extended from the mounting portion to pass through a hole of the flexure slantwise, and a connection bar connected with two ends of the spring arms for urging a leading edge of the slider to provide a downward component force to the slider. Due to the existence of the downward component force, thus the pitch and roll static toque is avoided and the slider is prevented popping out the tongue when flying above a rotating test disk during testing. Furthermore, as the spring arms are extended from the mounting portion downward to pass though the hollow of the flexure slantwise, so that the spring arms are located beneath the tongue, and the connection bar is positioned above the tongue, thus a sufficient elastic deformation is obtained to extend the lifetime of the clamp, and moreover a larger spring stoke is obtained to clamp the slider firmly with cooperating with the probes.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a slider supporting apparatus providing a larger spring stroke with long lifetime to reduce cost, and avoiding pitch and roll static torque to generate so as to prevent the slider popping out the suspension during slider testing process.

Figure 4A:
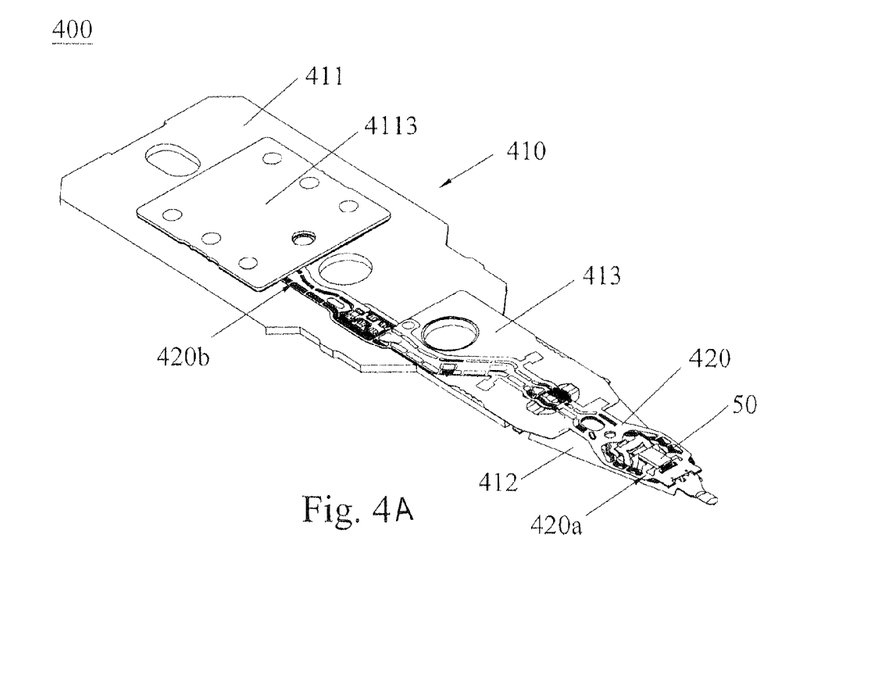
FIG. 4A is a perspective view of a slider supporting apparatus with a slider thereon according to one embodiment of the present invention.
Figure 5A:
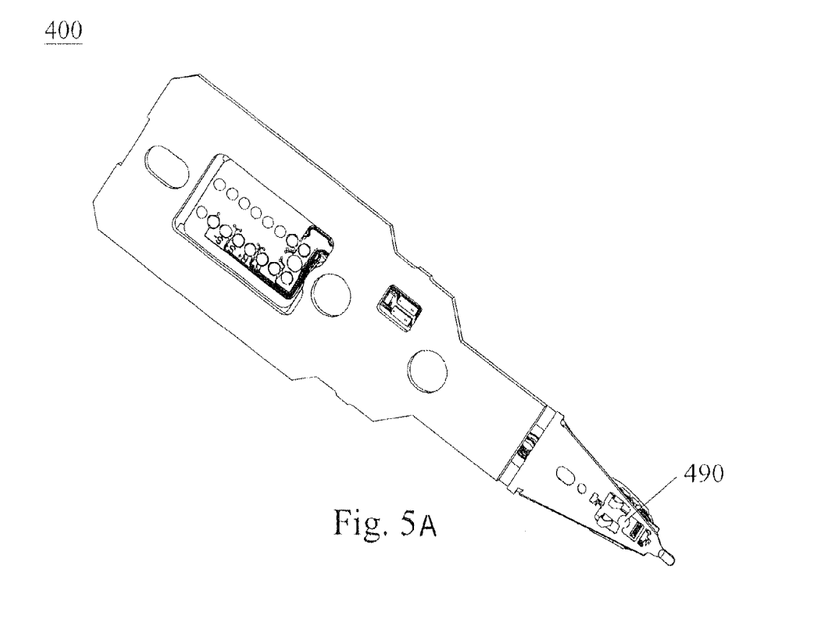
FIG. 5A is another perspective view of the slider supporting apparatus shown in FIG. 4A.
Figure 11:
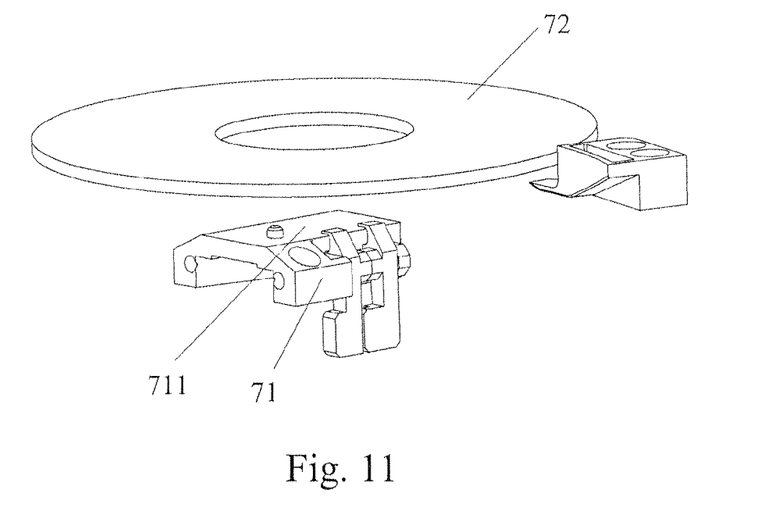
FIG. 11 shows a part of a tester cooperated with the slider supporting apparatus.

FIGS. 4A and 5A are perspective views of a slider supporting apparatus according to one embodiment of the present invention. The slider supporting apparatus 400 is applicable to a slider tester (as shown in FIG. 11) for testing a slider 50 which is used in a hard disk drive. As shown, the slider supporting apparatus 400, like an HGA suspension of the HDD, includes a base portion 410 and a flexure 420 supported by the base portion 410. The base portion 410 includes a base plate 411, a load beam 412, a hinge 413 arranged for connecting with the base plate 411 and the load beam 412.

Figure 4B:
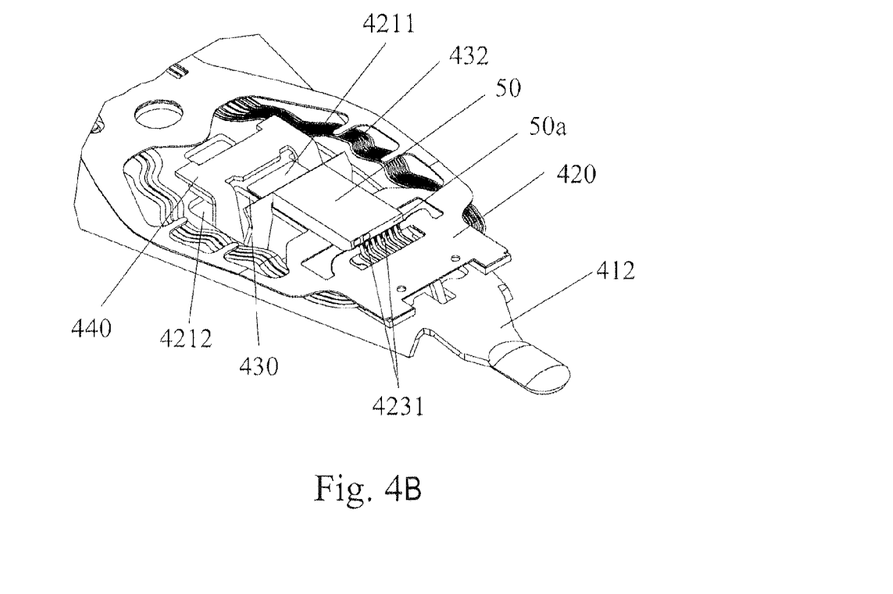
FIG. 4B is a partial perspective view of the slider supporting apparatus shown in FIG. 4A.
Figure 5B:
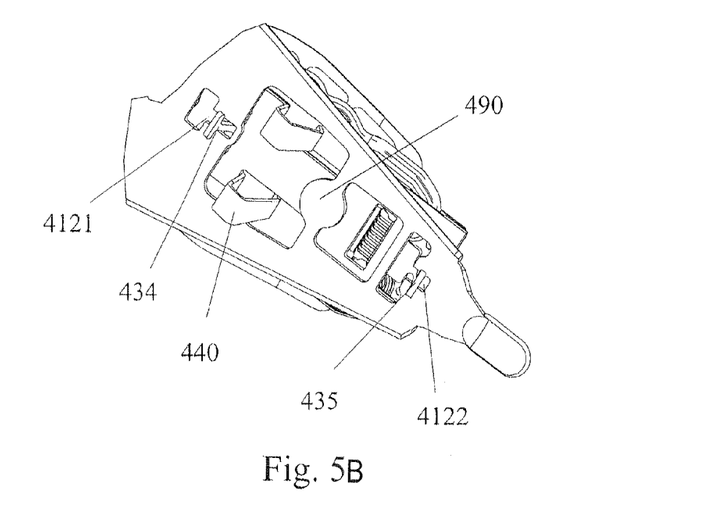
FIG. 5B is a partial perspective view of the slider supporting apparatus shown in FIG. 5A.

Referring to FIG. 4B, the load beam 412 is used to transfer load forces to the flexure 420, a support plate 430 and the slider 50 mounted on the flexure 420. Any suitable rigid material such as stainless steel may be used to form the load beam 412 such that the load beam 412 has sufficient stiffness to transfer the load forces to the flexure 420. The load beam 412 is connected to the base plate 411 by the hinge 413. A locating hole (not shown) is formed on the load beam 412 for aligning itself with the flexure 420. As shown in FIG. 5B, a dimple 490 is formed on the load beam 412 to support the flexure 420 at a position corresponding to a center of the slider. By this engagement of the dimple 490 with the flexure 420 and the support plate 430, the load forces can be transferred to the slider 50 uniformly. Preferably, two limiting holes 4121, 4122 are provided on the load beam 412.

The base plate 411 includes two mounting holes 4111, 4112 for fixing the whole slider supporting apparatus 400 on the work table (not shown). Preferably, the base plate 411 is provided with a handling area 4113 suitable for allowing a nozzle device 60 (referring to FIG. 10) to operate thereon, to carry the slider support apparatus 400 away from the work table after testing is finished. Thus robotization without manual operation can be achieved.

Figure 4C:
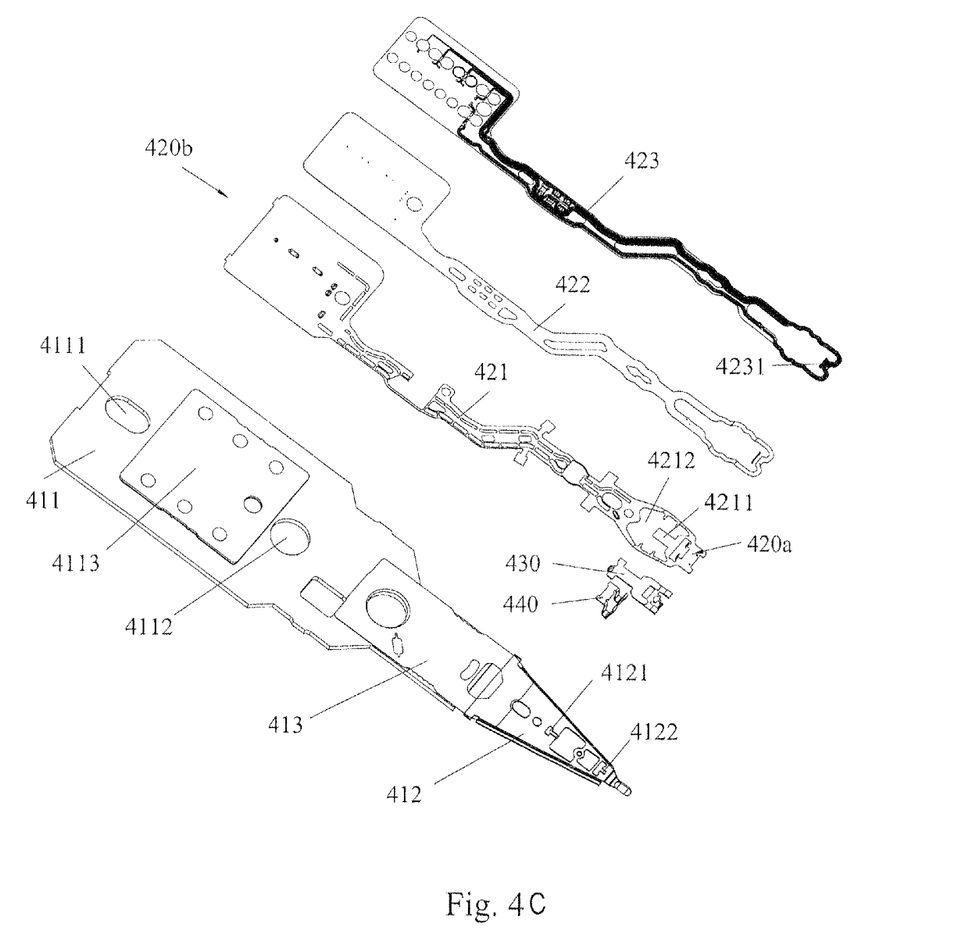
FIG. 4c is an exploded view of the slider supporting apparatus shown in FIG. 4A.

As shown in FIGS. 4A-4C, the flexure 420 runs from the load beam 412 to the hinge 413 and the base plate 411 in turns. The flexure 420 has a leading portion 420a and a tailing portion 420b opposite to the leading portion 420a. Preferably, as shown in FIG. 4C, the flexure 420 includes a substrate 421 made of stainless steel, an insulating layer 422 made of PI formed on the substrate 421, and a plurality of electrical traces 423 made of Cu formed on the insulating layer 422. A tongue 4211 is provided at the leading portion 420a of the substrate 421 to support the slider 50 thereon. The electrical traces 432 are formed on the flexure 420 along length direction thereof. More specifically, the electrical traces 432 extend from the leading portion 420a to the tailing portion 420b. In particular, the electrical traces 432 have a plurality of probes 4231 positioned at the leading portion 420a of the flexure 420, so as to urge the trailing edge 50a of the slider 50 to contact with pads (not labeled) on the trailing edge 50a for testing. At the tailing portion 420b of the flexure 420, the electrical traces 432 also provide a plurality of electrical pads (not shown) for testing.

To avoid generation of electro-static discharge (ESD) during the slider testing, an ESD circuit (not shown) including bi-diodes and resistors in provided and connected with the electrical traces 432 at the tailing portion 420b of the flexure 420. With the configuration of the circuit, high voltage produced by static electricity can be discharged to prevent the slider being damaged.

Figure 6:
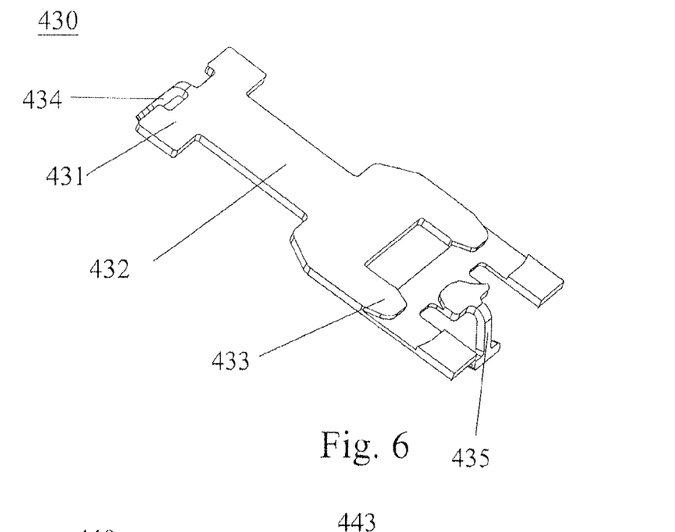
FIG. 6 is a perspective view of a support plate of the slider supporting apparatus.

Preferably, as shown in FIGS. 4B and 4C, a hollow 4212 is formed on the substrate 421, and one end of the tongue 4211 is extended from the leading portion 420a, and the other end is suspended at the hollow 4212. A support plate 430 is attached beneath the tongue 4211 and the leading portion 420a to enhance the supporting force. As shown in FIG. 6, the support plate 430 includes a first end portion 431, a neck portion 432 to support the tongue 4211, and a second end portion 433 to support the leading portion 420a of the flexure 420. Two limiters 434, 435 are provided on the first end portion 431 and the second end portion 433 respectively, to downward pass through the limiting holes 4121, 4122 on the load beam 412, thereby the movement of the support plate 430 is limited.

Figure 7A:
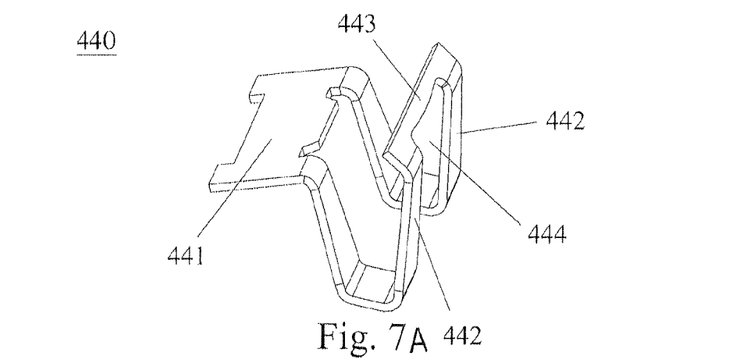
FIG. 7A is a perspective view of a clamp of the slider supporting apparatus according to one embodiment of the present invention.
Figure 7B:
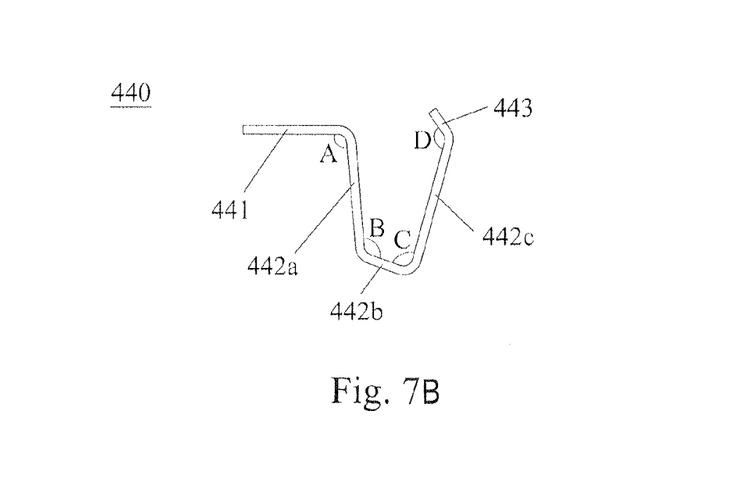
FIG. 7B is a side view of the clamp shown in FIG. 7A.

Referring to FIGS. 4A, 7A-7B, a clamp 440 is connected to the support plate 430 to provide a free end of a spring portion toward to the slider 50 mounted on the tongue 4211, thereby providing a spring force to clamp the slider 50. Specifically, the clamp 440 includes a mounting portion 441 fixed on the support plate 430, two spring arms 442 downward extended from the mounting portion 441, and a connection bar 443 connected with two ends of the spring arms 442 for urging the leading edge 50b of the slider 50, to provide a downward component force to the slider 50.

A predetermined spacing is provided between the two spring arms 442 to form an opening 444 to allow the tongue 4211 to insert, and the connection bar 443 is positioned above and across the tongue 4211. Concretely, the spring arms 442 are extended from the mounting portion 441 downward, to pass though the hollow 4212 of the substrate 421 slantwise. Generally, the spring arms 442 are located beneath the tongue 4211, and the connection bar 443 is positioned above the tongue 4211.

As an embodiment, the mounting portion 441 is parallel to the first end portion 431 of the support plate 430, and each spring arm 442 is bent downward along the mounting portion 441 to form a U-shaped spring arm 442. Specifically, as shown in FIG. 7B each spring arm 442 includes a first section 442a, a second section 442b and a third section 442c, a first angle A between the first section 442a and the mounting portion 441 is in a range of 80°~110°, a second angle B between the first section 442a and the second section 442b is in a range of 100°~125°, a third angle C between the second section 442b and the third section 442c is in a range of 80°~100°, and a fourth angle D between the third section 442c and the connection bar 443 is in a range of 110°~140°. As the best embodiment, the first angle A is 98°, the second angle B is 115°, the third angle C is 90°, and the fourth angle D is 126°, thereby obtaining the best spring force and performance, such as the clamp 440 with this configuration could work over 10000 times by experiment.

Concretely, the connection bar 443 is aslant, and an acute angle is formed between the connection bar 443 and the leading edge 50b of the slider 50.

Figure 8:
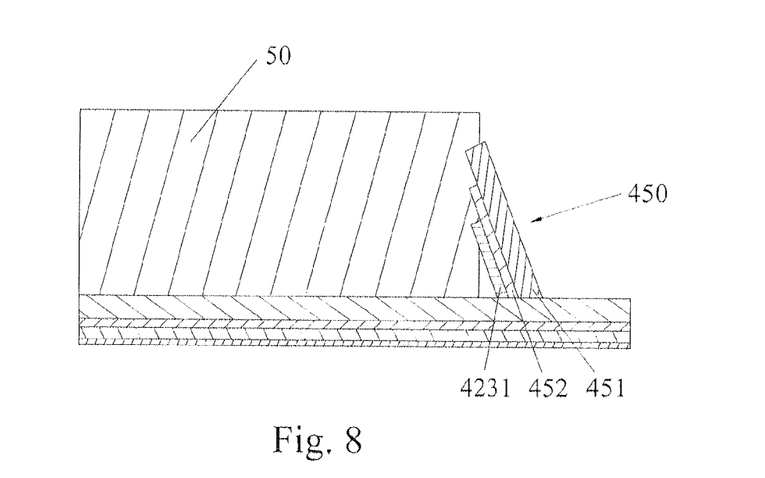
FIG. 8 shows a cross-section view of a contact portion of the slider supporting apparatus.

FIG. 8 shows a cross-section view of a contact portion 450 of the slider supporting apparatus 400 urging the slider 50. The contact portion 450 which is a part of the flexure 420 includes the probes 4231 contacted with pads on the trailing edge 50a of the slider 50, a rigid support layer 451 supported the probes 4231, and an insulating layer 452 sandwiched between the probes 4231 and the rigid support layer 451. Specifically, the rigid support layer 451 is formed to be a part of an outrigger of the flexure 420.

Figure 9:
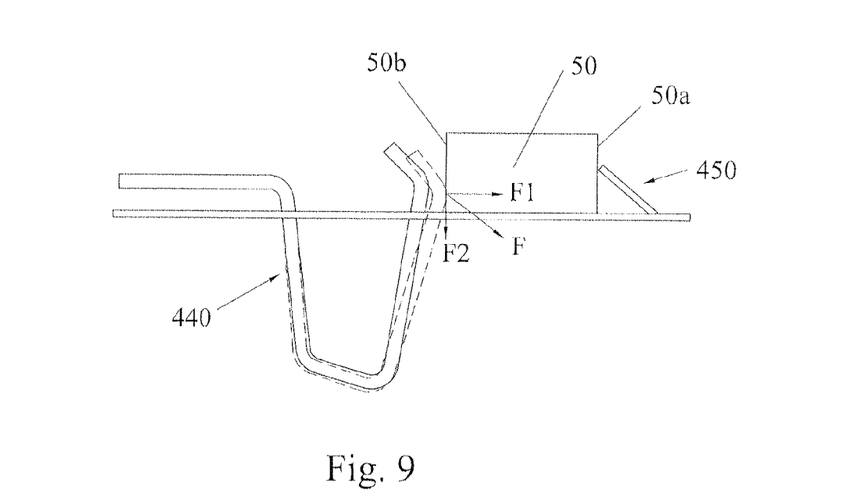
FIG. 9 shows a simple schematic diagram of the slider supporting apparatus with a slider mounted thereon, showing the force analysis between the clamp and the slider.

FIG. 9 shows a simple schematic diagram of the slider supporting apparatus 400 with a slider 50 mounted thereon, showing the force analysis between the clamp 440 and the slider 50. When the slider 50 is positioned on the tongue 4211 of the slider supporting apparatus 400 and then its leading edge 50b is clamped by the clamp 440, and its trailing edge 50a is urged by the probes 4231 of the contact portion 450. With the configuration of the clamp 440, the U-shaped clamp 440 provides a spring force with arrow indicated as F to the slider 50, which is divided into two component forces including a right component force F1 perpendicular to the leading edge 50b of the slider 50 and a downward component force F2 perpendicular to the tongue 4211. Due to the existence of the downward component force F2, thus the pitch and roll static toque is avoided and the slider 50 is prevented popping out from the tongue 4211 when flying above a rotating test disk during testing.

Furthermore, as the spring arms 442 are extended from the mounting portion 441 downward to pass though the hollow 4212 of the substrate 421 slantwise, so that the spring arms 442 are located beneath the tongue 4211, and the connection bar 443 is positioned above the tongue 4211, thus a sufficient elastic deformation is obtained to extend the lifetime of the clamp 440, and moreover a larger spring stoke is obtained to clamp 440 the slider 50 firmly with cooperating with the probes 4231.

As another optional embodiment, each spring arm 442 can be bent downward along the mounting portion 441 to form a V-shaped spring arm.

Figure 10:
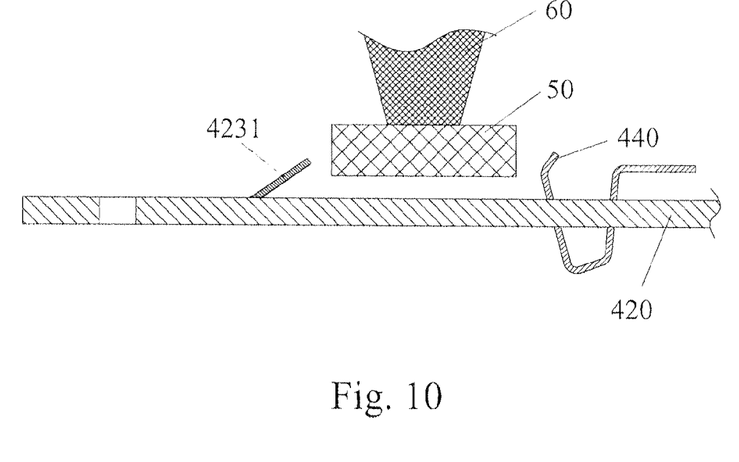
FIG. 10 shows operations of loading and unloading the slider on the slider supporting apparatus.

Operations of loading and unloading the slider 50 on the slider supporting apparatus 400 are described hereinafter, referring to FIG. 10. First, the clamp 440 is deformed to open a certain distance, by using a pushing device (not shown). Then, a vacuum nozzle 60 carrying the slider 50 moves down and places the slider 50 on the tongue 4211 in a predetermined position. Then release the clamp 440 to make the connection bar 443 to urge the slider 50. When no force is applied to the clamp 440, distance between the probes 4231 and connection bar 443 is smaller than a length of the slider 50, thus when the clamp 440 is released, its connection bar 443 and the probes 4231 will keep a firm clamping to the slider 50. Finally, the vacuum nozzle 60 will remove from the slider supporting apparatus 400. Thus, process of loading the slider 50 is finished. When unloading the slider 50, the vacuum nozzle 60 moves down to close to the slider 50 and stop at a certain height to slider surface where the vacuum nozzle 60 can suck slider 50 up easily. Then open the clamp 440 and the slider 50 will be sucked up quickly. Then the vacuum nozzle 60 with slider 50 will move a certain distance backward from the probes 4231. And at last the vacuum nozzle 60 will move away with slider 50 upward.

FIG. 11 shows a part of a tester 70 cooperated with the slider supporting apparatus 400. The slider supporting apparatus 400 with the slider 50 will be fixed on a work table 711 of the dynamic performance testing fixture 71. Testing process is performed with the slider 50 flying above a rotating disk 72.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A slider supporting apparatus comprising:
   a base portion;
   a flexure supported by the base portion, the flexure comprising a tongue carrying a slider and a leading portion connected with the tongue; a contact portion being provided on the leading portion arranged for urging a trailing edge of the slider to contact with pads on the trailing edge;
   a support plate attached beneath the tongue; and
   a clamp comprising a mounting portion fixed on the support plate, two spring arms downward extended from the mounting portion to pass through a hole of the flexure slantwise, and a connection bar connected with two ends of the spring arms for urging a leading edge of the slider to provide a downward component force to the slider.

2. The slider supporting apparatus according to claim 1, wherein a predetermined spacing is provided between the two spring arms to allow the tongue to insert, and the connection bar is positioned above and across the tongue.

3. The slider supporting apparatus according to claim 1, wherein each spring arm comprises a first section, a second section and a third section, a first angle between the first section and the mounting portion is in a range of 80°~110°, a second angle between the first section and the second section is in a range of 100°~125°, a third angle between the second section and the third section is in a range of 80°~100°, and a fourth angle between the third section and the connection bar is in a range of 110°~140°.

4. The slider supporting apparatus according to claim 1, wherein the mounting portion is parallel to the support plate, and each spring arm is bent downward along the mounting portion to form a U-shaped spring arm.

5. The slider supporting apparatus according to claim 1, wherein the mounting portion is parallel to the support plate, each spring arm is bent downward along the mounting portion to form a V-shaped spring arm.

6. The slider supporting apparatus according to claim 1, wherein the contact portion comprises a plurality of probes contacted with pads on the trailing edge of the slider, a rigid support layer supported the probes, and an insulating layer sandwiched between the probes and the rigid support layer.

7. The slider supporting apparatus according to claim 6, wherein the rigid support layer is formed to be a part of an outrigger of the flexure.

8. The slider supporting apparatus according to claim 1, wherein the base portion comprise a base plate, a load beam, and a hinge arranged for connecting with the base plate and the load beam.

9. The slider supporting apparatus according to claim 8, wherein the base plate comprises a handling area to allow a nozzle device to operate thereon.

10. The slider supporting apparatus according to claim 8, wherein two limiting holes are provided on the load beam, two limiters are provided on two ends of the support plate to pass through the limiting holes.

* * * * *